US009279041B2

(12) United States Patent
Nowe et al.

(10) Patent No.: US 9,279,041 B2
(45) Date of Patent: Mar. 8, 2016

(54) EXPANDABLE VINYL AROMATIC POLYMERS

(75) Inventors: Stéphane Nowe, Monein (FR); Philippe Lodefier, Wemmel (BE); Laetitia Urbanczyk, La Louvière (BE)

(73) Assignee: TOTAL RESEARCH & TECHNOLOGY FELUY, Seneffe (BE)

(*) Notice: Subject to any disclaimer, the term of this patent is extended or adjusted under 35 U.S.C. 154(b) by 59 days.

(21) Appl. No.: 14/128,781

(22) PCT Filed: Jun. 7, 2012

(86) PCT No.: PCT/EP2012/060816
§ 371 (c)(1),
(2), (4) Date: Apr. 3, 2014

(87) PCT Pub. No.: WO2012/175345
PCT Pub. Date: Dec. 27, 2012

(65) Prior Publication Data
US 2014/0221513 A1 Aug. 7, 2014

(30) Foreign Application Priority Data
Jun. 23, 2011 (EP) .................................. 11171225

(51) Int. Cl.
*C08K 3/04* (2006.01)
*C08K 3/34* (2006.01)
*C08J 9/18* (2006.01)
*C08J 9/228* (2006.01)
*C08J 9/232* (2006.01)
*C08J 9/00* (2006.01)
*C08J 9/14* (2006.01)

(52) U.S. Cl.
CPC ...... *C08J 9/18* (2013.01); *C08J 9/0061* (2013.01); *C08J 9/0066* (2013.01); *C08J 9/141* (2013.01); *C08J 9/232* (2013.01); *C08K 3/04* (2013.01); *C08K 3/34* (2013.01); *C08J 2205/044* (2013.01); *C08J 2325/04* (2013.01); *C08J 2491/00* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | | |
|---|---|---|---|
| 5,373,026 A * | 12/1994 | Bartz et al. | 521/82 |
| 5,525,636 A * | 6/1996 | Henn et al. | 521/59 |
| 6,476,089 B1 | 11/2002 | Maletzko et al. | |
| 6,538,042 B1 | 3/2003 | Berghmans et al. | |
| 6,632,382 B1 * | 10/2003 | Miller et al. | 264/45.9 |
| 6,783,710 B1 | 8/2004 | Walder | |
| 6,864,298 B2 | 3/2005 | Maletzko et al. | |
| 7,018,700 B2 | 3/2006 | Park | |
| 2002/0072547 A1 * | 6/2002 | Barron et al. | 521/59 |
| 2005/0156344 A1 | 7/2005 | Dietzen et al. | |
| 2006/0022366 A1 * | 2/2006 | Iwamoto et al. | 264/45.9 |
| 2006/0211780 A1 | 9/2006 | Passaplan et al. | |
| 2007/0105967 A1 | 5/2007 | Rauniyar et al. | |
| 2007/0112082 A1 | 5/2007 | Hahn et al. | |
| 2007/0299152 A1 | 12/2007 | Patel et al. | |
| 2008/0139682 A1 | 6/2008 | Vo et al. | |
| 2008/0248272 A1 | 10/2008 | Felisari et al. | |
| 2010/0179236 A1 | 7/2010 | Bosnyak et al. | |

FOREIGN PATENT DOCUMENTS

| | | |
|---|---|---|
| EP | 0126459 A3 | 2/1987 |
| EP | 0 372 343 A1 | 6/1990 |
| EP | 0372343 A1 | 6/1990 |
| EP | 0620246 B1 | 10/1994 |
| EP | 2 267 065 A1 | 12/2010 |
| WO | 97/45477 A1 | 12/1997 |
| WO | 2006/058733 A1 | 6/2006 |
| WO | 2006/108672 A2 | 10/2006 |
| WO | 2007/045454 A1 | 4/2007 |
| WO | 2008/061678 A2 | 5/2008 |
| WO | 2008/141766 A1 | 11/2008 |
| WO | 2010/141400 A1 | 12/2010 |

OTHER PUBLICATIONS

Ma, W. Y. Effects of Nucleating Agents' Size and Surface Treatment on Polymeric Microcellular Foaming. Thesis. Department of Mechanical and Industrial Engineering, University of Toronto. Mar. 2008.*
Holland, H. J. and Murtagh, M. J. An XRD Morphology Index for Talcs: The Effect of Particle Size and Morphology on the Specific Surface Area. Advances of X-Ray Analysis. vol. 42, 2000, pp. 421-428.*
Placido, E., et al., "Thermal properties predictive model for insulating foams", Infrared Physics & Technology, 2005, vol. 46, pp. 219-231.
Schellenberg, J., et al., "Dependence of Thermal Properties of Expandable Polystyrene Particle Foam on Cell Size and Density", Journal of Cellular Plastics, May 2010, vol. 46, pp. 209-222.
Arpe, H.-J., et al. (Ed.), Ullmann'S Encyclopedia of Industrial Chemistry, fifth edition, 1995, vol. A26, pp. 655-659.
International Search Report issued in PCT/EP2012/060816 mailed on Jul. 17, 2012 (4 pages).

* cited by examiner

*Primary Examiner* — Robert C Boyle
*Assistant Examiner* — Stephen Rieth
(74) *Attorney, Agent, or Firm* — Albert Shung

(57) ABSTRACT

The present invention discloses an expandable vinyl aromatic polymer comprising:
a) a matrix of a vinyl aromatic polymer,
b) 1-10% by weight, calculated with respect to the polymer (a), of a blowing agent embedded in the polymeric matrix,
c) 0.1 to 5% by weight, calculated with respect to the polymer (a), of talcum having a D50 particle size, measured by sedigraph (ISO 13317-3), of between 2.3 and 5 μm and a BET specific surface area, measured according to DIN 66131/2, of between 4.2 and 9.5 $m^2/g$,
d) 0.1 to 6% by weight, calculated with respect to the polymer of carbon black with a BET specific surface area, measured according to ASTM D-6556, of between 9 and 65 $m^2/g$,
e) 0.1 to 1% by weight, calculated with respect to the polymer (a), of polyethylene wax homogeneously distributed in the polymeric matrix.

9 Claims, No Drawings

EXPANDABLE VINYL AROMATIC POLYMERS

CROSS-REFERENCE TO RELATED APPLICATIONS

This application claims the benefit of PCT/EP2012/060816, filed on Jun. 7, 2012, which claims priority from EP 11171225.3, filed on Jun. 23, 2011.

FIELD OF THE INVENTION

The present invention relates to expandable vinyl aromatic polymers, in particular, to expandable polystyrene granulates (EPS) containing specific talcum and carbon black powders associated to wax.

The invention also relates to the foams obtained by the sintering of expanded particles that are obtained from those expandable vinyl aromatic polymers, and in particular to insulation boards with enhanced heat-insulation capacity.

STATE OF THE ART

Expandable vinyl aromatic polymers have been known for a long time for preparing heat insulation boards/sheets in the building industry. These planks are obtained by expanding impregnated beads of expandable polymer and moulding the expanded beads by means of pressure and temperature. The expansion of the EPS particles is generally performed with steam, at a temperature slightly higher than the glass transition temperature of the polymer.

Thermoplastic vinyl aromatic polymers such as polystyrene can be made expandable by incorporating a blowing agent in the polymeric matrix. Typical blowing agents for vinyl aromatic polymers include at least one liquid hydrocarbon at room temperature containing from 3 to 7 carbon atoms, a halogenated hydrocarbon, carbon dioxide or water. The quantity of blowing agent is conditioned by its molecular weight and by the foam density to be obtained. It usually ranges from 2 to 15% by weight, preferably from 3 to 9%.

Expandable polymers are generally produced as beads or granules which, under the action of heat, typically supplied by steam, are first expanded to a desired density and, after a certain aging period, are sintered in moulds to any suitable shape.

EPS expansion technology is well known in the art and notably described in EP 126 459, US 2006/211780, US 2005/156344, U.S. Pat. No. 6,783,710 and WO 2008/141766.

Talcum is the most common cell regulator for EPS and various types have been disclosed for this purpose in the prior art.

Carbon black is known as an infrared absorber decreasing the thermal conductivity of expanded beads later sintered to insulation planks.

EP 372 343 A1 describes EPS comprising carbon black and talcum and mentions that the use of 10% carbon black reduces the thermal conductivity by 15%. An abundant patent literature testifies the use of carbon black for this purpose.

WO 97/45477 A1 describes an EPS comprising 2-8% carbon black having a BET nitrogen surface area ranging from 10 to 500 $m^2/g$. Some expanded and sintered EPS compositions achieve a thermal conductivity λ between 30-33 mW/mK at 10° C. average temperature.

EP 620 246 B1 describes expanded polystyrene foam with a density of less than 20 $kg/m^3$ comprising athermanous particles absorbing infrared radiation.

WO 2006/058733 A1 relates to expandable styrene polymer granulates, containing
a) between 5 and 50 wt % of a filler, selected from pulverulent inorganic materials such as talc, chalk, kaolin, aluminium hydroxide, aluminium nitrite, aluminium silicate, barium sulphate, calcium carbonate, titanium dioxide, calcium sulphate, silicic acid, quartz powder, aerosil, alumina or wollastonite and
b) between 0.1 and 10 wt % carbon black or graphite.

In example 2, there are 1 wt % carbon black and 10 w % chalk, the thermal conductivity λ is 32 mW/mK.

Other disclosures discussing similar effects of cell regulators and infrared absorbers such as carbon black are US 2007/0112082 A1, WO 2006/108672 A2, WO 2007/045454 A1, WO 2008/141766 A1 and WO 2008/061678 A2.

However, carbon black has already been reported several times as a strong nucleating agent in the patent literature, leading to foams containing undesirably small cell size (U.S. Pat. No. 6,864,298 B2, U.S. Pat. No. 6,538,042 B1, U.S. Pat. No. 6,476,089 B1).

The cell structure plays a crucial role for achieving good insulation properties and mechanical resistance. It has been reported in the literature (Placido, E., Arduini-Schuster, M. C., Kuhn, J., *Infrared Physics & Technology*, 2005, 46, 219; Schellenberg, J., Wallis, M., *Journal of Cellular Plastics*, 2010, 46, 209) that at given density, there is an optimum cell size to reach the best insulation properties. It is therefore critical to have a good control over the cell size.

Some cell-size enlarger agents have been disclosed, such as polyethylene glycol in US 2007/0299152 or glycerol monostearate in U.S. Pat. No. 7,018,700 B2. These additives can be used to increase the cell size. However, these softening agents usually have a negative impact on the beads expandability.

It has now been discovered that a specific selection of carbon black associated to a specific selection of talcum and wax has a cell-size distribution narrowing effect. This unexpected behavior allows to easily reach the desired cell size without compromising the expansion process.

Thus, the cell size of foam can be controlled simply by selecting the type and the amount of carbon black associated to a specific talcum and wax for a finer control of the cellular morphology

AIMS OF THE INVENTION

The present invention aims to provide expandable vinyl aromatic polymer granulates in particular, expandable polystyrene granulates (EPS) containing a combination of specific talcum and carbon-black powders associated to wax allowing expanded particles that are obtained from those granulates to have a specific cell-size range and a narrower cell-size distribution leading, once sintered as insulation planks, to improved heat insulation capacity.

SUMMARY OF THE INVENTION

The present invention discloses an expandable vinyl aromatic polymer comprising:
a) a matrix of a vinyl aromatic polymer,
b) 1-10% by weight, calculated with respect to the polymer (a), of a blowing agent embedded in the polymeric matrix,
c) 0.1 to 5% by weight, calculated with respect to the polymer (a), of talcum having a D50 particle size, measured by sedigraph (ISO 13317-3), of between 2.3 and 5 μm and a BET specific surface area, measured according to DIN 66131/2, of between 4.2 and 9.5 $m^2/g$, d) 0.1 to 6% by weight, calculated with respect to the polymer (a), of carbon black with a BET specific surface area, measured according to ASTM D-6556, of between 9 and 65 m$^2$/g, e) 0.1 to 1% by weight, calculated with respect to the polymer (a), of polyethylene wax homogeneously distributed in the polymeric matrix.

The present invention more specifically discloses an expandable vinyl aromatic polymer comprising:

a) a matrix of a vinyl aromatic polymer comprising at least 80 wt % polystyrene, b) 3-8% by weight, calculated with respect to the polymer (a), of a blowing agent embedded in the polymeric matrix, c) 0.5 to 2% by weight, calculated with respect to the polymer (a), of talcum having a D50 particle size, measured by sedigraph (ISO 13317-3), of between 2.3 and 5 µm and a BET specific surface area, measured according to DIN 66131/2, of between 4.2 and 9.5 m$^2$/g, d) 1 to 6% by weight, calculated with respect to the polymer (a), of carbon black with a BET specific surface area, measured according to ASTM D-6556, of between 9 and 31 m$^2$/g, e) 0.2 to 0.8% by weight, calculated with respect to the polymer (a), of polyethylene wax homogeneously distributed in the polymeric matrix.

A preferred embodiment of the present invention is an expandable vinyl aromatic polymer comprising:

a) a matrix of a vinyl aromatic polymer comprising at least 80 wt % polystyrene, b) 3-8% by weight, calculated with respect to the polymer (a), of a blowing agent embedded in the polymeric matrix, c) 0.5 to 2% by weight, calculated with respect to the polymer (a), of talcum having a D50 particle size, measured by sedigraph (ISO 13317-3), of between 2.3 and 5 µm and a BET specific surface area, measured according to DIN 66131/2, of between 4.2 and 9.5 m$^2$/g, d) 3 to 6% by weight, calculated with respect to the polymer (a), of carbon black with a BET specific surface area, measured according to ASTM D-6556, of between 9 and 31 m$^2$/g, e) 0.2 to 0.8% by weight, calculated with respect to the polymer (a), of polyethylene wax of the type HDPE and a molecular mass of less than 2500 homogeneously distributed in the polymeric matrix.

The expandable vinyl aromatic polymer of the present invention comprises a hydrocarbon blowing agent which is a mix of 80 wt % n-pentane and 20 wt % iso-pentane.

The present invention further discloses a vinyl aromatic polymer foam comprising expanded vinyl aromatic polymer particles according to the present invention wherein the mean cell size is between 80 and 200 µm, wherein the standard deviation of the cell size is lower than 50 µm and wherein the thermal conductivity λ of the foam is lower than 32 mW/mK (ISO 8301), the density of the foam being lower than 22 g/l.

The ratio between the standard deviation and the mean cell size is comprised between 0.17 and 0.39, and preferably between 0.17 and 0.29 in the vinyl aromatic polymer foam of the present invention.

DETAILED DESCRIPTION OF THE INVENTION

As regards the vinyl aromatic polymer, mention may be made of:

polystyrene, elastomer-modified polystyrene, copolymers of styrene and acrylonitrile (SAN), elastomer-modified SAN, in particular ABS, which is obtained, for example, by grafting (graft polymerization) of styrene and acrylonitrile on a backbone of polybutadiene or of butadiene-acrylonitrile copolymer, mixtures of SAN and ABS, copolymers with styrene blocks and blocks made of butadiene or isoprene or of a mixture butadiene/isoprene, these block copolymers can be linear blocks copolymers or star blocks copolymers, they can be hydrogenated and/or functionalized. These copolymers are described in ULLMANN'S ENCYCLOPEDIA OF INDUSTRIAL CHEMISTRY, fifth edition (1995), Vol. A26, pages 655-659. They are sold by Total Petrochemicals under the trademark Finaclear®, by BASF under the trademark Styrolux®, under the trademark K-Resin® by Chevron Phillips Chemical, SBR (styrene butadiene rubber).

Possible examples of the above-mentioned elastomers are EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer and copolymers with styrene blocks and blocks made of butadiene or isoprene or of a mixture butadiene/isoprene. These block copolymers can be linear blocks copolymers or star blocks copolymers, they can be hydrogenated and/or functionalized (see above).

In the above-mentioned vinyl aromatic polymer, part of the styrene may be replaced by unsaturated monomers copolymerizable with styrene, for example alpha-methylstyrene or (meth)acrylates. Other examples of styrene copolymers which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

In a specific embodiment, the vinyl aromatic polymer comprises:

i) from 60 to 100 wt % of one or more $C_{8-12}$ vinyl aromatic monomers, and ii) from 0 to 40 wt % of one or more monomers selected from the group consisting of $C_{1-4}$ alkyl esters of acrylic or methacrylic acid and acrylonitrile and methacrylonitrile; which polymer may be grafted onto or occluded within from 0 to 20 wt % of one or more rubbery polymers.

By way of example rubbery polymers can be selected from the group consisting of:

a) co- and homopolymers of $C_{4-6}$ conjugated diolefins, b) copolymers comprising from 60 to 85 wt % of one or more $C_{4-6}$ conjugated diolefins and from 15 to 40 wt % of a monomer selected from the group consisting of acrylonitrile and methacrylonitrile, and c) copolymers comprising from 20 to 60, preferably from 40 to 50 wt % of one or more $C_{5-12}$ vinyl aromatic monomers which are un-substituted or substituted by a $C_{1-4}$ alkyl radical and from 60 to 40, preferably from 60 to 50 wt % of one or more monomers selected from the group consisting of $C_{4-6}$ conjugated diolefins.

The rubber may be prepared by a number of methods, preferably by emulsion or solution polymerization. These processes are well known to those skilled in the art. The vinyl aromatic polymers may be prepared by a number of methods. This process is well known to those skilled in the art. If present, the rubber is preferably present in an amount from about 3 to 10 wt %. Polybutadiene is a particularly useful rubber.

In the specific embodiment in which the vinyl aromatic polymer is polystyrene, it could be crystal polystyrene or rubber modified polystyrene. The rubber modified polystyrene is called HIPS (High Impact Polystyrene). The process for making HIPS is well known to those skilled in the art. The rubber is "dissolved" in the styrene monomer (actually, the rubber is infinitely swollen with the monomer). This results in two co-continuous phases. The resulting "solution" is fed to a reactor and polymerized typically under shear. When the degree of polymerization is about equal to the weight % of rubber in the system, it inverts (i.e. the styrene/styrene polymer phase becomes continuous and the rubber phase becomes discontinuous). After phase inversion, the polymer is finished in a manner essentially similar to that for finishing polystyrene. The polymer is prepared using conventional bulk, solution, or suspension polymerization techniques.

The vinyl aromatic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably, the vinyl aromatic monomer is styrene. The vinyl aromatic polymer may be a copolymer comprising from 60 to 100 wt % of one or more $C_{8-12}$ vinyl aromatic monomers and from 0 to 40 wt % of one or more monomers selected from the group consisting of $C_{1-4}$ alkyl esters of acrylic or methacrylic acid and acrylonitrile and methacrylonitrile. Suitable esters of acrylic and methacrylic acid include methyl acrylate, ethyl acrylate, butyl acrylate, methyl methacrylate, ethyl methacrylate and butyl methacrylate. The vinyl aromatic polymers of the present invention may be rubber modified. Advantageously the vinyl aromatic polymer is a monovinylaromatic polymer.

As regards the expanding agent, it is selected from aliphatic or cyclo-aliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodi-fluoromethane, 1,2,2-trifluoroethane, 1,1,2-trifluoroethane; carbon dioxide and water. As regards pentane, a mixture of n and iso is advantageously used. The proportion of pentane is advantageously in the range 3 to 7 w %.

As regards talc having a mean diameter above about 1 μm, said mean diameter being measured by Sedigraph according to standard ISO 13317-3, one can cite the 20M00S supplied by the company Rio Tinto Minerals (Talcs de Luzenac). Advantageously, the talc has a mean diameter above about 1 μm and under 100 μm, more advantageously in the range 2-50 μm, preferably in the range 2-30 μm, more preferably in the range 2-12 μm. Advantageously, the D(95) is around 50 μm or below, more advantageously around 30 μm, much more advantageously around 20 μm, preferably around 12 μm. D(95) means that 95% of particles are smaller than this value. Advantageously, the BET of the talc is in the range 3-20 $m^2/g$ and preferably in the range 3-10 $m^2/g$. The proportion of talc is advantageously from 0.5 to 2 w %, and preferably around 1%.

As regards carbon black, the proportion can easily be determined by the man skilled in the art. The thermal conductivity of the foam decreases with the increasing proportion of carbon black. The range can be from about 1 to about 6 wt %. It is easy with a reduced number of experiments to find the proportion to reach a thermal conductivity λ of about 32 mW/mK or lower of the foam. The carbon black has advantageously a surface area (preferably the BET nitrogen surface area), measured according to ASTM D-6556, ranging from 2 to 400 $m^2/g$, more advantageously from 5 to 200 $m^2/g$. Preferably, said surface area ranges from 8 to 100 $m^2/g$, and more preferably from 9 to 65 $m^2/g$. One can cite the Ensaco® 150, Ensaco®260 supplied by the company Timcal; Lamp Black® 101, Printex® 30 supplied by Evonik; Black Pearl® 120, Black Pearl® 4040 supplied by Cabot Corp.

As regards fillers, among non-limitative examples of material that are able to reduce the thermal conductivity and/or to enhance the properties of the expanded vinyl aromatic polymer, one can cite graphite, mica, silica, titanium dioxide, coke, aluminium flakes and barium sulfate.

One can cite also flame retardants, nucleating agents, plasticizers and agents which facilitate the demoulding of the moulded and expanded articles. In particular, it may comprise at least one flame retardant selected in particular from halogenated hydrocarbons, preferably brominated hydrocarbons, in particular C6 to C12 hydrocarbons, such as hexabromocyclohexane, penta-bromomono-chlorocyclohexane or hexabromocyclododecane, in an amount which can range from 0.05 to 3 parts, preferably from 0.1 to 1.5 parts, by weight, per 100 parts by weight of the styrene polymer. The composition may further comprise at least one nucleating agent selected in particular from synthetic waxes, in particular Fischer-Tropsch waxes and polyolefin waxes such as polyethylene waxes or polypropylene waxes, in an amount which can range from 0.05 to 1 part, preferably from 0.1 to 0.5 part, by weight, per 100 parts by weight of the vinyl aromatic polymer. The composition may likewise comprise at least one plasticizer, selected in particular from mineral oils and petroleum waxes such as paraffin waxes, in an amount which can range from 0.1 to 1 part, preferably from 0.1 to 0.8 part, by weight, per 100 parts by weight of the vinyl aromatic polymer.

The composition may additionally comprise at least one agent which facilitates the demoulding of the moulded and expanded articles, selected in particular from inorganic salts and esters of stearic acid, such as glycerol mono-, di or tristearates and zinc stearate, calcium stearate or magnesium stearate, in an amount which can range from 0.05 to 1 part, preferably from 0.1 to 0.6 part, by weight per 100 parts by weight of the vinyl aromatic polymer.

As regards the process to make said expandable polymer, it is carried out by mixing the vinyl aromatic polymer in the melted state with the blowing agent or agents, talc carbon black and the fillers.

In an advantageous embodiment, the mixing is carried out in a chamber equipped with at least one stirring means and under temperature and pressure conditions that are capable of preventing the expansion of the composition, preferably in an extruder, in particular a single-screw or twin-screw extruder, or in one or more static mixers at a temperature greater than the glass transition temperature of the polymer, in particular a temperature ranging from 120 to 250° C. and under an absolute pressure ranging from 0.1 to 10 MPa.

The production method of such expandable beads has already been described in EP 126 459, US 2006/211780, US 2005/156344, U.S. Pat. No. 6,783,710 and WO 2008/141766, the content of which is incorporated in the present invention.

EXAMPLES

Example 1

A mixture containing 97.7 parts of polystyrene (PS 1450 N of Total Petrochemicals), 1 part of talc from Rio Tinto®

(mean particle size: 5 μm), 0.3 part of polyethylene wax (HDPE Mw=2000 g/mol) from Baker Petrolite Polymers Division and 1 parts of carbon black from Timcal (BET: 65 m$^2$/g) are fed in an extruder. 6 w % of pentane (80/20 n-/iso pentane) is injected in the extruder. The sample is finally granulated at die exit by an underwater pelletizer with a face cutting system. The output of the double screw extruder is 50 Kg/h. The recovered beads, whose diameter is in the range 1-1.5 mm, are then treated with zinc stearate as coating agent. The treated beads are pre-expanded with steam at 100° C. in a preexpander (EDVD—150 Erlenbach), left to age for 1 day and finally used to mould a board of 5 cm. After 1 day, the density of the board, determined by weighing the board and measuring its dimensions, is 19.8 g/l. The thermal conductivity of the board, measured according to the norm ISO 8301, is 31 mW/mK.

Example 2

Expandable beads are produced with the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black from Timcal (BET: 65 m$^2$/g). The board obtained has a density of 18.7 g/l. The thermal conductivity of the board, measured according to norm ISO 8301, is 30 mW/mK.

Example 3

Expandable beads are produced in the same conditions than described in Example 1, except that the initial mixture contains 94.2 parts of polystyrene, 1 part of talc from Rio Tinto® (mean particle size: 5 μm), 0.3 part of polyethylene wax (HDPE Mw=2000 g/mol) and 4.5 parts of carbon black from Timcal (BET: 65 m$^2$/g). The board obtained has a density of 20.9 g/l. The thermal conductivity of the board, measured according to norm ISO 8301, is 30 mW/mK.

Example 4

Expandable beads are produced in the same conditions as described in Example 1, except that the initial mixture contains 92.7 parts of polystyrene, 1 part of talc from Rio Tinto® (mean particle size: 5 μm), 0.3 part of polyethylene wax (Mw=2000 g/mol) and 6 parts of carbon black from Timcal (BET: 65 m$^2$/g). The board obtained has a density of 20.5 g/l. The thermal conductivity of the board, measured according to norm ISO 8301, is 29 mW/mK.

Example 5

Expandable beads are produced in the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black from Timcal (BET: 50 m$^2$/g). The board obtained has a density of 17.9 g/l. The thermal conductivity of the board, measured according to norm ISO 8301, is 31 mW/mK.

Example 6

Expandable beads are produced in the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black CSX691 from Cabot Corp. The board obtained has a density of 18.1 g/l. The thermal conductivity of the board, measured according to norm ISO 8301, is 31 mW/mK.

Example 7

Expandable beads are produced in the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black from Evonik (BET: 9 m$^2$/g). The board obtained has a density of 17 g/l. The thermal conductivity of the board, measured according to norm ISO 8301, is 30 mW/mK.

Example 8

Expandable beads are produced in the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black from Cabot (BET: 31 m$^2$/g). The board obtained has a density of 16.8 g/l. The thermal conductivity of the board, measured according to norm ISO 8301, is 31 mW/mK.

Example 9

Expandable beads are produced in the same conditions as described in Example 1, except that the initial mixture contains 95.7 parts of polystyrene, 1 part of talc from Mondo Minerals® (mean particle size: 2.3 μm), 0.3 part of polyethylene wax (Mw=2000 g/mol) and 3 parts of carbon black from Cabot (BET: 31 m$^2$/g). The board obtained has a density of 18.3 g/l. The thermal conductivity of the board, measured according to norm ISO 8301, is 30 mW/mK.

Comparative Example 1

Expandable beads are produced in the same conditions as described in Example 1, except that the initial mixture contains 98.7 parts of polystyrene, 1 part of talc from Rio Tinto® (mean particle size: 5 μm) and 0.3 part of polyethylene wax (Mw=2000 g/mol). No carbon black is added. The board obtained has a density of 21.7 g/l. The thermal conductivity of the board, measured according to norm ISO 8301, is 35 mW/mK.

Comparative Example 2

Expandable beads are produced with the same conditions as described in Example 1, except that the initial mixture contains 95.7 parts of polystyrene, 1 part of talc from Rio Tinto® (mean particle size: 5 μm) and 3 parts of carbon black from Timcal (BET: 65 m$^2$/g). No wax is added. The board obtained has a density of 18.4 g/l. The thermal conductivity of the board, measured according to norm ISO 8301, is 34 mW/mK.

Comparative Example 3

Expandable beads are produced with the same conditions as described in Example 1, except that the initial mixture contains 95.7 parts of polystyrene, 0.3 part of polyethylene wax (Mw=2000 g/mol) and 3 parts of carbon black from Timcal (BET: 65 m$^2$/g). No talc is added. The board obtained has a density of 20.5 g/l. The thermal conductivity of the board, measured according to norm ISO 8301, is 34 mW/mK.

Comparative Example 4

Expandable beads are produced with the same conditions as described in Example 1, except that the initial mixture contains 95.7 parts of polystyrene, 1 part of talc from Rio Tinto® (mean particle size: 0.7 μm), 0.3 part of polyethylene wax (Mw=2000 g/mol) and 3 parts of carbon black from Timcal (BET: 65 m²/g). The board obtained has a density of 18 g/l. The thermal conductivity of the board, measured according to norm ISO 8301, is 33 mW/mK.

Comparative Example 5

Expandable beads are produced with the same conditions as described in Example 1, except that the initial mixture contains 95.7 parts of polystyrene, 1 part of talc from Rio Tinto® (mean particle size: 5 μm), 0.3 part of polyethylene wax (Mw=2000 g/mol) and 3 parts of carbon black from Timcal (BET: 770 m²/g). The board obtained has a density of 19.5 g/l. The thermal conductivity of the board, measured according to norm ISO 8301, is 33 mW/mK.

Discussion

Example 1 illustrates the topic of the present invention, i.e. the production of efficient low lambda moulded EPS board for insulation purpose, and the preparation of the expandable beads thereof. In fact, when the carbon black is used in combination with talc and wax in judicious proportions, the cell size (about 100 μm) is advantageously controlled and leads to an efficient insulation coefficient at low carbon black content.

In the comparative Example 1, the same board is produced without carbon black addition. The obtained mean cell size is smaller, about 50 μm, and the insulation coefficient accordingly higher.

Examples 2 to 4 illustrate the invention with increasing carbon black content, from 3 to 6 wt %. This shows an increase of the mean cell size, going from 102 to 164 μm. The carbon black thus efficiently acts as cell-size enlarger, and allows to reach an ideal cellular morphology (cell size between 100 and 200 μm), leading to more performing insulation boards. In fact, the insulation coefficient is around 29-31 mW/mK for board densities around 19-21 g/l.

The ability of carbon black to act as cell-size enlarger when judiciously combined with talc and wax is demonstrated in Examples 5 to 8 for different carbon-black grades. These examples show that carbon black of specific surface area going from 9 to 65 m²/g can be efficient as cell-size enlarger, as long as they are combined with talc and wax in accurate proportion. Very satisfactory insulation performance is obtained in these four examples. In contrast, Comparative Example 5 shows that using carbon black of too high specific surface area of 770 m²/g is not effective in significantly enhancing the board insulation performance.

In Example 9 and Comparative Example 4, the talc grades used have smaller mean particle size/higher BET specific surface area than the one used in the former examples (talc 1, see Table III). Satisfactory insulation performance is obtained with talc 2 while talc 3 leads to too small cell size and thus higher lambda values.

Comparative Examples 2 and 3 refer to moulded boards prepared from expandable beads containing carbon black/talc (no wax) and carbon black/wax (no talc) formulation, respectively. These two boards show undesirably small cells diameter (47-60 μm) and the corresponding insulation performance is clearly negatively affected (34 mW/mK). In comparison, Example 2 containing the same amount of the carbon black, in combination with talc and wax leads to much lower lambda coefficient (30 mW/mK), which is attributed to the more judicious cellular morphology obtained thanks to the particular filler combination.

These examples thus demonstrate that very satisfactory insulation performance can be obtained when accurately controlling the cell size of the foamed board. In the present invention, this control is achieved with the combination of three specific fillers: carbon black, talc and wax.

Specification of Talcum:

TABLE I

| Talc | Provider | Particle size: D50-D90 (sedigraph, ISO 13317-3) | Specific surface area (BET, m²/g) |
|---|---|---|---|
| 1 | Rio Tinto | 5-12 | 4.2 |
| 2 | Mondo Minerals | 2.3-10 | 9.5 |
| 3 | Rio Tinto | 0.7-2.9 | 21 |

Specification of the Various Carbon Black Types:

TABLE II

| Carbon black | Provider | Specific surface area (BET, m²/g) |
|---|---|---|
| CSX 691 | Cabot Corp. | 16 |
| Black Pearls 120 | | 31 |
| Ensaco 150G | Timcal Graphite & Carbon | 50 |
| Ensaco 250G | | 65 |
| Ensaco 350G | | 770 |
| Arosperse 15 | Evonik | 9 |
| Lampblack 101 | | 29 |

The variable parameter is underlined in the following Table III:

TABLE III

| Ex. | Carbon black type | Talc grade | CB wt % | Talc wt % | Wax wt % | d (g/l) | Lambda (mW/mK)[1] | Mean cell size | Standard dev. | Stand dev/mean cell size |
|---|---|---|---|---|---|---|---|---|---|---|
| 1 | 250G | 1 | 1 | 1 | 0.3 | 19.8 | 31 | 91 | 31 | 0.34 |
| 2 | | | 3 | | | 18.7 | 30 | 102 | 40 | 0.39 |
| 3 | | | 4.5 | | | 20.5 | 30 | 153 | 42 | 0.27 |
| 4 | | | 6 | | | 20 | 29 | 164 | 48 | 0.29 |
| 5 | 150G | 1 | 3 | | | 17.9 | 31 | 159 | 30 | 0.19 |
| 6 | CSX691 | 1 | 3 | | | 18.1 | 31 | 188 | 39 | 0.21 |
| 7 | Arosperse 15 | 1 | 3 | 1 | 0.3 | 17 | 30 | 137 | 27 | 0.20 |
| 8 | Black Pearls 120 | 1 | 3 | 1 | 0.3 | 16.8 | 31 | 180 | 32 | 0.18 |
| 9 | | 2 | 3 | 1 | 0.3 | 18.3 | 30 | 152 | 26 | 0.17 |
| C1 | — | 1 | 0 | 1 | 0.3 | 21.7 | 35 | 50 | 31 | 0.62 |
| C2 | 250G | 1 | 3 | 1 | 0 | 18.4 | 34 | 47 | 20 | 0.42 |
| C3 | | 1 | 3 | 0 | 0.3 | 20.5 | 34 | 60 | 24 | 0.4 |

TABLE III-continued

| Ex. | Carbon black type | Talc grade | CB wt % | Talc wt % | Wax wt % | d (g/l) | Lambda (mW/mK)[1] | Mean cell size | Standard dev. | Stand dev/ mean cell size |
|---|---|---|---|---|---|---|---|---|---|---|
| C4 | | 3 | 3 | 1 | 0.3 | 18 | 33 | 82 | 20 | 0.24 |
| C5 | 350G | 1 | 3 | 1 | 0.3 | 19.5 | 33 | 284 | 136 | 0.48 |

The invention claimed is:

1. A vinyl aromatic polymer foam obtained from expanded vinyl aromatic polymer particles, wherein the expanded vinyl aromatic polymer particles are obtained from an expandable vinyl aromatic polymer comprising:
   a) a matrix of a vinyl aromatic polymer,
   b) 1-10% by weight, calculated with respect to the vinyl aromatic polymer (a), of a blowing agent embedded in the matrix,
   c) 0.1 to 5% by weight, calculated with respect to the vinyl aromatic polymer (a), of talcum having a D50 particle size, measured by sedigraph (ISO 13317-3), of between 2.3 and 5 μm and a BET specific surface area, measured according to DIN 66131/2, of between 4.2 and 9.5 m$^2$/g,
   d) 0.1 to 6% by weight, calculated with respect to the vinyl aromatic polymer (a), of carbon black with a BET specific surface area, measured according to ASTM D-6556, of between 9 and 65 m$^2$/g,
   e) 0.1 to 1% by weight, calculated with respect to the vinyl aromatic polymer (a), of polyethylene wax homogenously distributed in the matrix, wherein the vinyl aromatic polymer foam has i) a mean cell size between 80 and 200 μm, ii) a standard deviation of the mean cell size lower than 50 μm, iii) a thermal conductivity λ lower than 32 mW/mK (ISO 8301), and iv) a density lower than 22 g/L.

2. The vinyl aromatic polymer foam according to claim 1, wherein the expandable vinyl aromatic polymer comprises:
   a) the matrix of the vinyl aromatic polymer comprises at least 80 wt % polystyrene,
   b) the blowing agent is present in an amount ranging from 3-8% by weight, calculated with respect to the vinyl aromatic polymer (a), wherein the blowing agent is embedded in the matrix,
   c) the talcum is present in an amount ranging from 0.5 to 2% by weight, calculated with respect to the vinyl aromatic polymer (a),
   d) the carbon black is present in an amount ranging from 1 to 6% by weight, calculated with respect to the vinyl aromatic polymer (a), and wherein the carbon black has a BET specific surface area, measured according to ASTM D-6556, of between 9 and 31 m$^2$/g,
   e) 0.2 to 0.8% by weight, calculated with respect to the vinyl aromatic polymer (a), of the polyethylene wax, wherein the polyethylene wax is homogeneously distributed in the matrix.

3. The vinyl aromatic polymer foam according to claim 1, wherein the expandable vinyl aromatic polymer comprises:
   a) the matrix of the vinyl aromatic polymer comprises at least 80 wt % polystyrene,
   b) the blowing agent is present in an amount ranging from 3-8% by weight, calculated with respect to the vinyl aromatic polymer (a), wherein the blowing agent is embedded in the matrix,
   c) the talcum is present in an amount ranging from 0.5 to 2% by weight, calculated with respect to the vinyl aromatic polymer (a),
   d) the carbon black is present in an amount ranging from 3 to 6% by weight, calculated with respect to the vinyl aromatic polymer (a), and wherein the carbon black has a BET specific surface area, measured according to ASTM D-6556, of between 9 and 31 m$^2$/g,
   e) the polyethylene wax is present in an amount ranging from 0.2 to 0.8% by weight, calculated with respect to the vinyl aromatic polymer (a), and wherein the polyethylene wax is of the type HDPE, has a molecular mass of less than 2500, and is homogeneously distributed in the matrix.

4. The vinyl aromatic polymer foam according to claim 1, wherein the blowing agent is a mix of 80 wt % n-pentane and 20 wt % iso-pentane.

5. The vinyl aromatic polymer foam according to claim 1, wherein a ratio between the standard deviation and the mean cell size is between 0.17 and 0.39.

6. The vinyl aromatic polymer foam according to claim 1, wherein a ratio between the standard deviation and the mean cell size is between 0.17 and 0.29.

7. The vinyl aromatic polymer foam according to claim 1, wherein the mean cell size is between 100 and 200 μm.

8. The vinyl aromatic polymer foam according to claim 1, wherein the talcum has a D95 particle size, measured by sedigraph (ISO 13317-3), of 50 μm or below.

9. The vinyl aromatic polymer foam according to claim 1, wherein the talcum has a D95 particle size, measured by sedigraph (ISO 13317-3), of around 30 μm, or around 20 μm, or around 12 μm.

* * * * *